(12) United States Patent
Toyoshima et al.

(10) Patent No.: US 12,542,891 B2
(45) Date of Patent: Feb. 3, 2026

(54) DISPLAY DEVICE

(71) Applicant: Magnolia White Corporation, Tokyo (JP)

(72) Inventors: Yosuke Toyoshima, Tokyo (JP); Kensuke Shioda, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 19/002,265

(22) Filed: Dec. 26, 2024

(65) Prior Publication Data

US 2025/0220152 A1 Jul. 3, 2025

(30) Foreign Application Priority Data

Dec. 27, 2023 (JP) ................. 2023-221491

(51) Int. Cl.
*H04N 13/368* (2018.01)
*H04N 13/31* (2018.01)

(52) U.S. Cl.
CPC ........... *H04N 13/368* (2018.05); *H04N 13/31* (2018.05)

(58) Field of Classification Search
CPC ............................. H04N 13/368; H04N 13/31
See application file for complete search history.

(56) References Cited

U.S. PATENT DOCUMENTS

| | | | |
|---|---|---|---|
| 2007/0285775 A1* | 12/2007 | Lesage .................. | G02F 1/1335 359/465 |
| 2009/0040426 A1 | 2/2009 | Mather et al. | |
| 2022/0300111 A1* | 9/2022 | Yellepeddi ............. | G06F 3/044 |

FOREIGN PATENT DOCUMENTS

| | | | |
|---|---|---|---|
| JP | 2005-078092 A | 3/2005 | |
| JP | 2006-195388 A | 7/2006 | |

* cited by examiner

*Primary Examiner* — Jae N Noh
(74) *Attorney, Agent, or Firm* — K&L Gates LLP (57) ABSTRACT

First electrodes include a left-side first electrode disposed on a left side of a virtual line bisecting a display region and passing through a geometric center of the display region, and a right-side first electrode disposed on a right side of the virtual line, and a detector includes a determination processor configured to determine a detection target moving from the left side to the right side to be a left-side user approaching from the left side based on a detection value of the left-side first electrode, and determine the detection target moving from the right side to the left side of the display region to be a right-side user approaching from the right side based on a detection value of the right-side first electrode.

6 Claims, 12 Drawing Sheets

DISPLAY DEVICE

CROSS-REFERENCE TO RELATED APPLICATION

This application claims the benefit of priority from Japanese Patent Application No. 2023-221491 filed on Dec. 27, 2023, the entire contents of which are incorporated herein by reference.

BACKGROUND

1. Technical Field

The present disclosure relates to a display device.

2. Description of the Related Art

A known dual-screen display is capable of displaying an image that is visually recognizable only by a user positioned on the left side with respect to a display screen and another image that is visually recognizable only by a user positioned on the right side with respect to the display screen (for example, Japanese Patent Application Laid-open Publication No. 2005-078092). Another known display device mounted in a vehicle such as a four-wheel automobile allows an image to be visually recognized from the front passenger seat side but does not allow the image to be visually recognized from the driver seat side while driving (for example, Japanese Patent Application Laid-open Publication No. 2006-195388). It has been desired to combine such a display device with a touch detection device capable of detecting a detection target approaching from the outside, thereby enabling touch operations by one of a plurality of users while disabling touch operations by the other user.

However, such a display device with touch detection functionality has been unable to identify whether a detection target is a left-side user approaching from the left side or a right-side user approaching from the right side. Thus, an operation by a user who cannot visually recognize a displayed image is potentially determined to be an operation by a user who can visually recognize the displayed image.

For the foregoing reasons, there is a need for a display device capable of enabling touch operations by one of a plurality of users while disabling touch operations by the other user.

SUMMARY

According to an aspect, a display device includes a display panel including a display region configured to display an image, a plurality of first electrodes provided in a frame region outside the display region, a plurality of second electrodes provided in the display region, and a detector configured to detect a detection target based on detection signals of the first electrodes, wherein the first electrodes include a left-side first electrode disposed on a left side of a virtual line bisecting the display region and passing through a geometric center of the display region, and a right-side first electrode disposed on a right side of the virtual line, and the detector includes a determination processor configured to determine the detection target moving from the left side to the right side to be a left-side user approaching from the left side based on a detection value of the left-side first electrode, and determine the detection target moving from the right side to the left side of the display region to be a right-side user approaching from the right side based on a detection value of the right-side first electrode.

DETAILED DESCRIPTION

Aspects (embodiments) of the present invention will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is only an example, and any modifications that can be easily conceived by those skilled in the art while maintaining the main purpose of the present disclosure are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present disclosure and the drawings, the same reference sign is applied to the same elements as those already described for the previously mentioned drawings, and detailed explanations may be omitted as appropriate.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

First Embodiment

Figure 1:
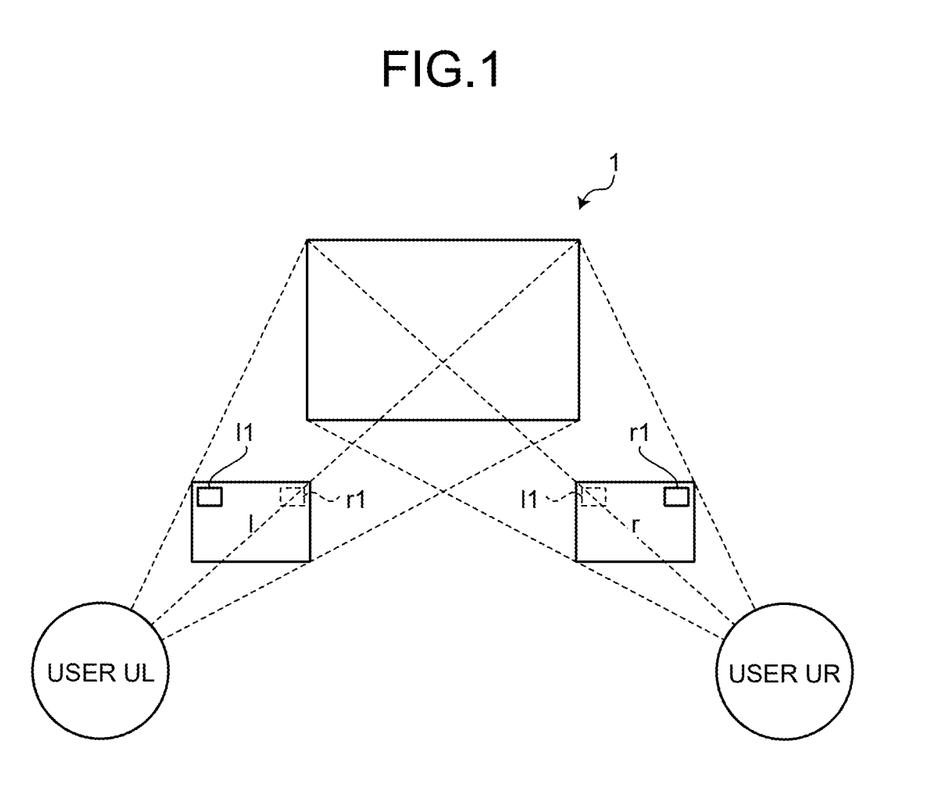
FIG. 1 is a diagram illustrating an overview of a display panel according to a first embodiment.
Figure 2:
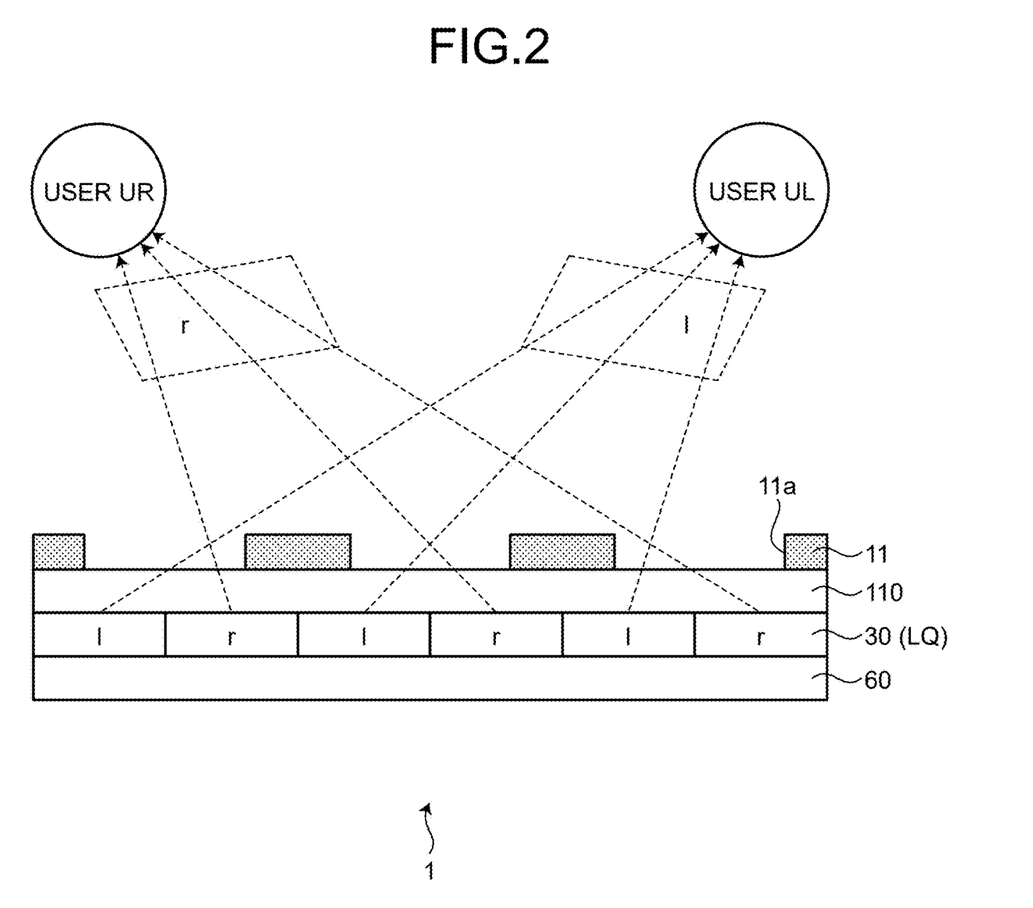
FIG. 2 is a schematic sectional view of the display panel according to the first embodiment.

FIG. 1 is a diagram illustrating an overview of a display panel according to a first embodiment. FIG. 2 is a schematic sectional view of the display device according to the first embodiment. As illustrated in FIG. 1, this display device 1 can display a first image 1 to a user UL positioned on the left side with respect to a display panel, and can display a second image r different from the first image 1 to a user UR positioned on the right side with respect to the display panel. When a dual-screen display operation mode is turned off and display is performed in a single-screen display operation mode, the display device 1 can display identical images to the user UL and the user UR.

For example, as illustrated in FIG. 1, the user UL who is a left-side user can visually recognize a button 11 displayed in the first image 1 but cannot visually recognize a button r1 displayed in the second image r. The user UR who is a right-side user can visually recognize the button r1 displayed in the second image r but cannot visually recognize the button 11 displayed in the first image 1. The button r1 and the button 11 are each what is called a graphical user interface (GUI) and may be another graphic object such as a window, an icon, or a menu other than a button.

In the dual-screen display operation mode, control allocated to the button 11 is executed when the user UL touches the button 11 displayed in the first image 1. Control allocated to the button r1 is executed when the user UR touches the button r1 displayed in the second image r. Control allocated to the button r1 should not be executed when the user UL touches the position of the button r1, which cannot be visually recognized by the user, in the first image 1. Control allocated to the button 11 should not be executed when the user UR touches the position of the button 11, which cannot be visually recognized by the user, in the second image r. Thus, when a touch is detected, the display device 1 needs to identify whether the touch is a touch operation by the user UL or the user UR and determine whether to execute control allocated to the touch position of the touch detection.

As illustrated in FIG. 2, a parallax barrier 11, a light-transmitting substrate 110, a display panel 30, and a light source 60 are stacked in the stated order in the display device 1. Only components related to dual-screen display are illustrated in the display device 1 in FIG. 2, whereas illustrations of polarization layers, electrodes, and the like are omitted.

Hereinafter, a direction in which the light source 60, the display panel 30, the light-transmitting substrate 110, and the parallax barrier 11 overlap is referred to as a third direction Dz, one of two directions orthogonal to the third direction Dz is referred to as a first direction Dx, and the other is referred to as a second direction Dy. The first direction Dx and the second direction Dy are orthogonal to each other.

The parallax barrier 11 is provided on the light-transmitting substrate 110. The light-transmitting substrate 110 is a light-transmitting substrate of glass or optical resin, for example. The parallax barrier 11 distributes light having transmitted through the display panel 30 to the user UL side or the user UR side.

The light source 60 uniformly irradiates the display panel 30. The light source 60 is, for example, an LED.

As illustrated in FIG. 2, in a liquid crystal layer LQ, the first image 1 that transmits light for displaying an image to the left-side user UL and the second image r that transmits light for displaying another image to the right-side user UR are alternately displayed in each row. The parallax barrier 11 is provided with a plurality of opening parts 11a penetrating in the third direction Dz, extending in the second direction Dy, and arranged at predetermined intervals in the first direction Dx.

With this configuration, the first image 1 is visually recognized by the user UL through the opening parts 11a of the parallax barrier 11, and the second image r is visually recognized by the user UR through the opening parts 11a of the parallax barrier 11.

Figure 3:
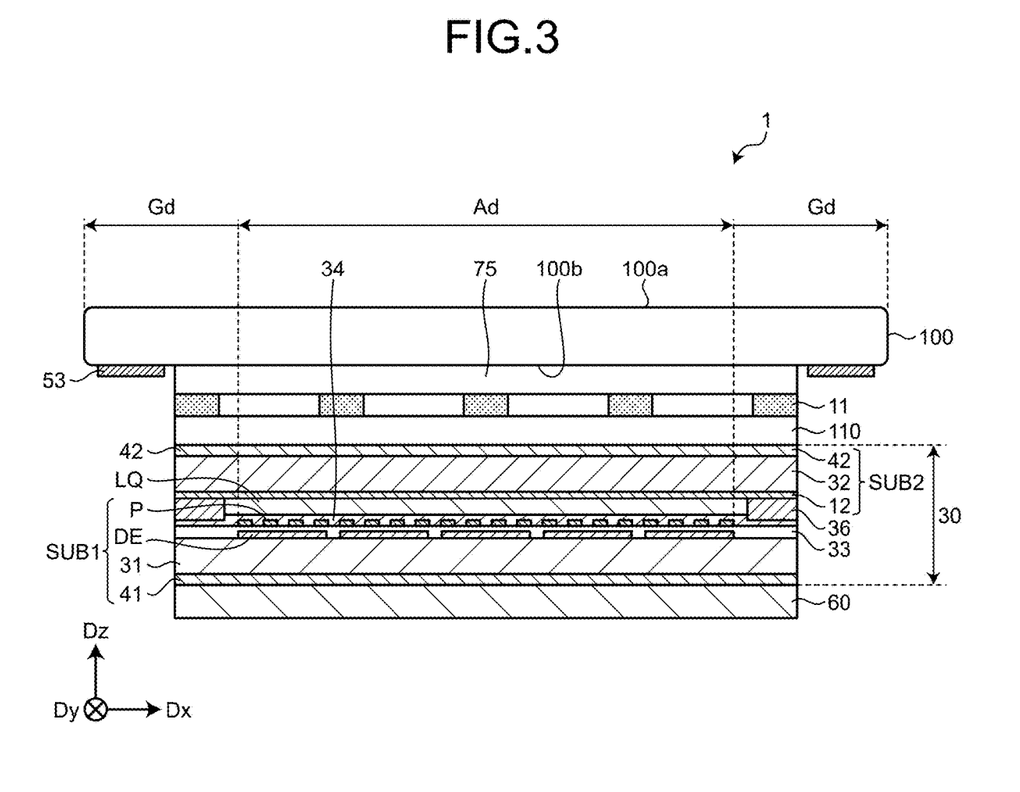
FIG. 3 is a sectional view illustrating a schematic sectional structure of a display device according to the first embodiment.

The following describes in detail an exemplary configuration of the display device 1 of the present embodiment. FIG. 3 is a sectional view illustrating a schematic sectional structure of the display device according to the first embodiment. As illustrated in FIG. 3, the display device 1 includes the light source 60, the display panel 30, the light-transmitting substrate 110, the parallax barrier 11, and a cover member 100 provided on the parallax barrier 11 with a bonding layer 75 interposed therebetween.

The cover member 100 is a plate-shaped or film-shaped member including a first surface 100a and a second surface 100b opposite the first surface 100a. The cover member 100 may be, for example, a glass substrate, a resin substrate, a resin film, or the like. The first surface 100a of the cover member 100 is a detection surface that serves as a reference surface when a detection target is detected. Detection of contact of a detection target with the detection surface is referred to as touch detection. Detection of the position or motion of a detection target while the detection target is not in contact with the detection surface is referred to as hover detection. In this manner, the display device 1 of the present embodiment performs touch detection when a detection target contacts the first surface 100a. The display device 1 can perform what is called hover detection (approach detection), which detects the position of a detection target such as a finger being separated from the first surface 100a by a predetermined distance. The first surface 100a is a display surface for a viewer to visually recognize an image on the display panel 30 having transmitted through a display region Ad.

As illustrated in FIG. 3, the display panel 30 includes the display region Ad configured to output (display) an image. The display region Ad is a region for displaying images where a plurality of pixel electrodes P are disposed in the display panel 30. In the display device 1, a frame region Gd is provided outside the display region Ad.

In the frame region Gd, a plurality of first electrodes 53 are provided on the second surface 100b of the cover member 100. The first electrodes 53 provided on the second surface 100b may be provided on the first surface 100a or the display panel 30. The first electrodes 53 may be made of, for example, a light-transmitting conductive material such as ITO. The first electrodes 53 function as detection electrodes during hover detection.

The display panel 30 is an image display liquid crystal panel of what is called an active matrix scheme, which is provided to be able to display and output an desired image by individually controlling the transmission degree of light at each pixel electrode P. More specifically, in the display panel 30 of the embodiment, potential as a reference is provided to second electrodes DE. Individual potentials (pixel signals) are provided to the pixel electrodes P, and accordingly, the transmission degree of light at each pixel electrode P are individually controlled. Thus, the display region Ad is a region in which an image is displayed and output.

The display panel 30 includes a pixel substrate SUB1, a counter substrate SUB2 provided oppositely in a direction perpendicular to the surface of the pixel substrate SUB1, and the liquid crystal layer LQ inserted between the pixel substrate SUB1 and the counter substrate SUB2.

The pixel substrate SUB1 includes a first polarization layer 41, a first substrate 31, the second electrodes DE, and the pixel electrodes P. The counter substrate SUB2 includes a second substrate 32, a color filter 12 formed on one surface of the second substrate 32, and a second polarization layer 42. The first polarization layer 41 is provided on one surface side of the first substrate 31. The second polarization layer 42 is provided on the other surface side of the second substrate 32.

The color filter 12 faces the liquid crystal layer LQ in a direction perpendicular to the first substrate 31. The color filter 12 may be disposed on the first substrate 31. In the present embodiment, the first substrate 31 and the second substrate 32 are, for example, glass substrates or resin substrates.

The second electrodes DE, an insulating layer 33, the pixel electrodes P, and an insulating layer 34 are stacked on the other surface side of the first substrate 31 from one side toward the other side in the third direction Dz. The second substrate 32 and the second polarization layer 42 are stacked on one surface of the color filter 12. A seal section 36 is interposed between the insulating layer 34 and the color filter 12 outside the display region Ad. The liquid crystal layer LQ is surrounded by the seal section 36 between the insulating layer 34 and the color filter 12 and accordingly, enclosed in the display panel 30.

Figure 5:
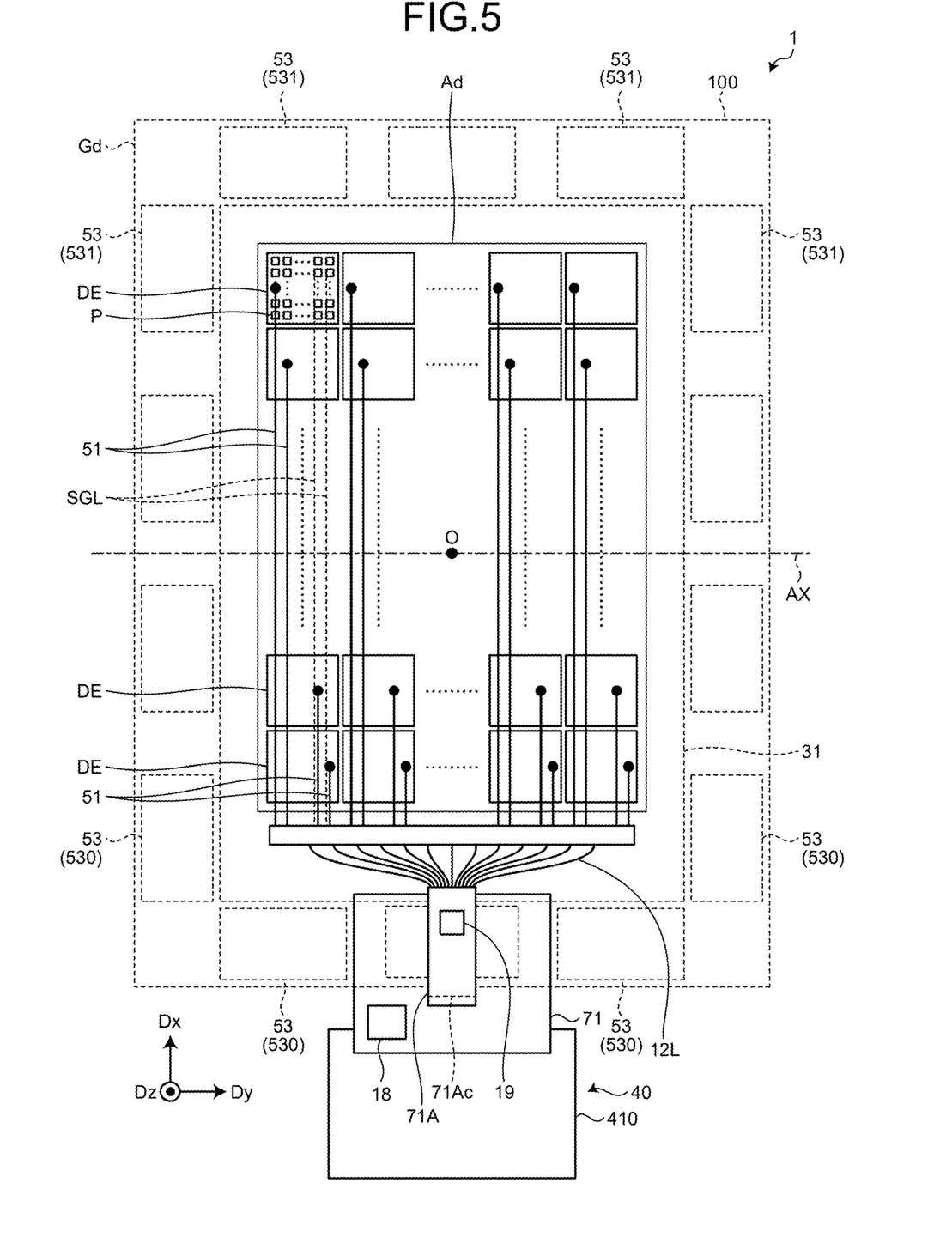
FIG. 5 is a plan view schematically illustrating the relation between first and second electrodes.

The pixel electrodes P are provided on the upper side of the second electrodes DE with the insulating layer 33 interposed therebetween, and disposed in a matrix (row-column configuration) in a plan view (refer to FIG. 5).

The first polarization layer 41 is provided on the lower side of the first substrate 31 with a bonding layer (not illustrated) interposed therebetween. The pixel electrodes P and the second electrodes DE are made of, for example, a light-transmitting conductive material such as indium tin oxide (ITO). The second electrodes DE detect the position of a detection target on the display region Ad. Each second electrode DE is supplied with a direct-current display drive signal during display operation and functions as a common electrode for a plurality of pixel electrodes P.

The second polarization layer 42 and the second surface 100b of the cover member 100 are bonded together with the bonding layer 75 interposed therebetween. The bonding layer 75 may be made of, for example, optical clear adhesive (OCA) or optical clear resin (OCR) that is liquid UV curable resin.

The liquid crystal layer LQ modulates passing light in accordance with the state of electric field and is, for example, liquid crystals in the horizontal electric field mode such as in-plane switching (IPS) including fringe field switching (FFS). Alignment films are disposed between the liquid crystal layer LQ and the pixel substrate SUB1 and between the liquid crystal layer LQ and the counter substrate SUB2, respectively, in FIG. 3.

The light source 60 is provided below the pixel substrate SUB1. Light from the light source 60 is emitted toward the first substrate 31 through the first polarization layer 41. Light from the light source 60 passes through a display panel 30 and is modulated in accordance with the state of liquid crystals at its position, and accordingly, the state of its transmission on the display surface changes with position. As a result, an image is displayed on the display surface (first surface 100a).

Figure 4:
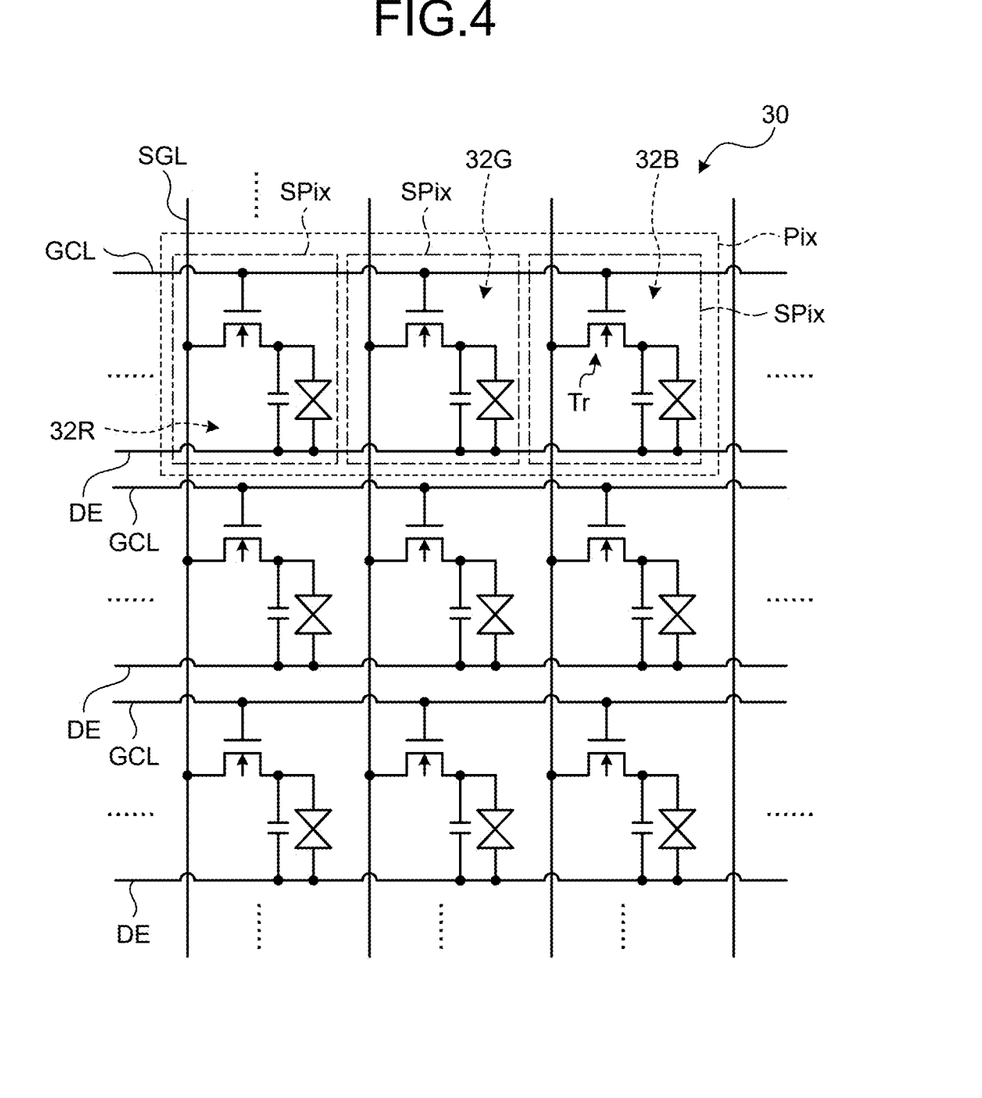
FIG. 4 is a circuit diagram illustrating the pixel array of a display region.

FIG. 4 is a circuit diagram illustrating the pixel array of the display region. For example, a switching element Tr, a signal line SGL, and a scanning line GCL of each sub pixel SPix illustrated in FIG. 4 are formed in the pixel substrate SUB1. The signal line SGL is a wiring line for supplying a pixel signal to pixel electrodes P (refer to FIG. 3). The scanning line GCL is a wiring line for supplying a gate signal that drives switching elements Tr.

A plurality of sub pixels SPix are included in each pixel Pix. Each sub pixel SPix includes capacitors of the switching element Tr and the liquid crystal layer LQ. The switching element Tr is constituted by a thin film transistor, and in this example, is constituted by an n-channel metal oxide semiconductor (MOS) type TFT. The insulating layer 33 is provided between the pixel electrodes P and the second electrodes DE to be described later, which forms holding capacitors Cs illustrated in FIG. 4.

The pixel electrodes P are provided corresponding to the sub pixels SPix constituting each pixel Pix of the display panel 30 and are supplied with pixel signals for performing display operation.

In the color filter 12 illustrated in FIG. 3, for example, color regions of color filters colored in three colors of red (R), green (G), and blue (B) may be periodically arranged. The sub pixels SPix illustrated in FIG. 4 are associated with a set of color regions 32R, 32G, and 32B in the three colors of R, G, and B, and each pixel Pix is constituted by a set of sub pixels SPix corresponding to the color regions 32R, 32G, and 32B in the three colors.

Figure 6:
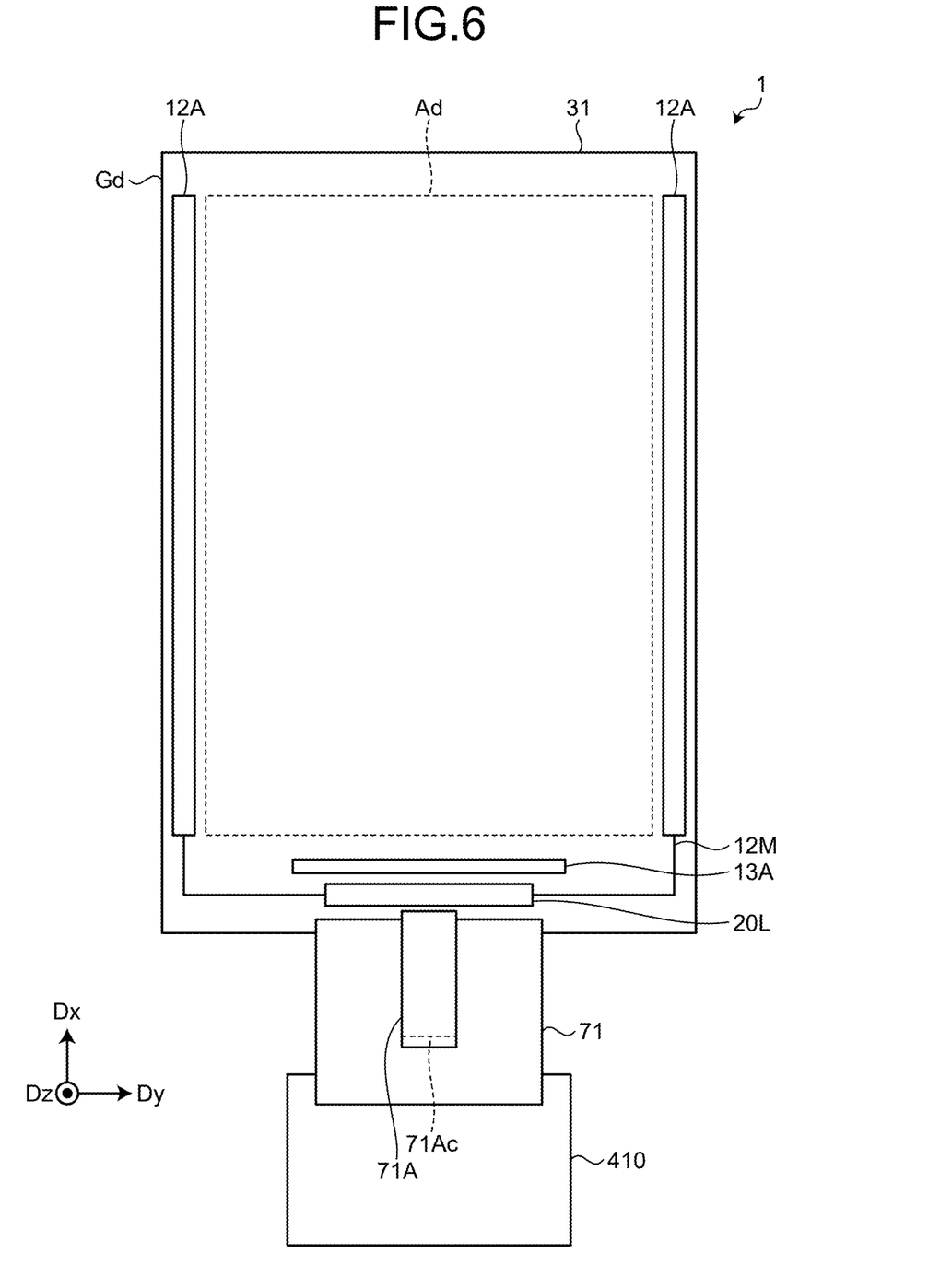
FIG. 6 is a plan view schematically illustrating the display device according to the first embodiment.

FIG. 5 is a plan view schematically illustrating the relation between the first and second electrodes. FIG. 6 is a plan view schematically illustrating the display device according to the first embodiment. A virtual line AX illustrated in FIG. 5 is a virtual line bisecting the display region and passing through a geometric center O of the display region along the second direction Dy.

As illustrated in FIG. 5, the display device 1 further includes flexible substrates 71 and 71A and a detector 40. Hereinafter, the left side means the left side (the flexible substrates 71 and 71A side) of the virtual line AX. The right side means the right side (side opposite the flexible substrates 71 and 71A) of the virtual line AX.

The detector 40 illustrated in FIG. 5 includes a control board 410 and detection ICs 18 and 19. The detection IC 18 is an IC for controlling detection operation of the first electrodes 53. The detection IC 19 is an IC for controlling detection operation of the second electrodes DE.

The first electrodes 53 illustrated in FIG. 5 include left-side first electrodes 530 disposed on the left side and right-side first electrodes 531 disposed on the right side.

As illustrated in FIGS. 5 and 6, the first electrodes 53 are provided in the frame region Gd of the first substrate 31, extend in the first direction Dx, and are arranged in a plurality in the second direction Dy.

As illustrated in FIG. 5, the flexible substrate 71 is coupled to the frame region Gd. The flexible substrate 71 is electrically coupled to the control board 410 through a coupler 71Ac. Each first electrode 53 is electrically coupled to the detection IC 18 through a wiring line (not illustrated) and the flexible substrate 71.

The flexible substrate 71A is coupled to the first substrate 31. The flexible substrate 71A is electrically coupled to the control board 410 through the coupler 71Ac. Each second electrode DE is electrically coupled to the detection IC 19 through a wiring line 12L and the flexible substrate 71A. The detection ICs 18 and 19 and a display IC 20L are not limited thereto but may be, for example, included in a control board outside the module.

As illustrated in FIG. 6, various circuits such as gate scanner circuits 12A and a multiplexer circuit 13A are provided in the frame region Gd.

The gate scanner circuits 12A are oppositely disposed at end parts of the display region Ad. In the present embodiment, the gate scanner circuits 12A are disposed on one end side and the other end side of the display region Ad, but may be disposed on only one of the end sides. The multiplexer circuit 13A is disposed between the display region Ad and the flexible substrate 71. The display IC 20L for controlling display operation of the display panel 30 is provided in the frame region Gd of the first substrate 31.

The gate scanner circuits 12A sequentially select the scanning lines GCL based on a control signal supplied through wiring lines 12M from the display IC 20L. The multiplexer circuit 13A sequentially selects the signal lines SGL based on a control signal supplied from the display IC 20L.

In the present embodiment, the cover member 100 and the display panel 30 have rectangular shapes in a plan view but are not limited thereto and may have circular shapes, oval shapes, or deformed shapes with some of these outer shapes missing. The outer shapes of the cover member 100 and the display panel 30 may be different, for example, the cover member 100 may have a circular shape and the display panel 30 may have a regular polygonal shape. The cover member 100 is not limited to being a flat plate, and a curved display having a curved surface can be employed. For example, the display region Ad may have a curved surface or the frame region Gd may be curved toward the display panel 30 side.

Figure 7:
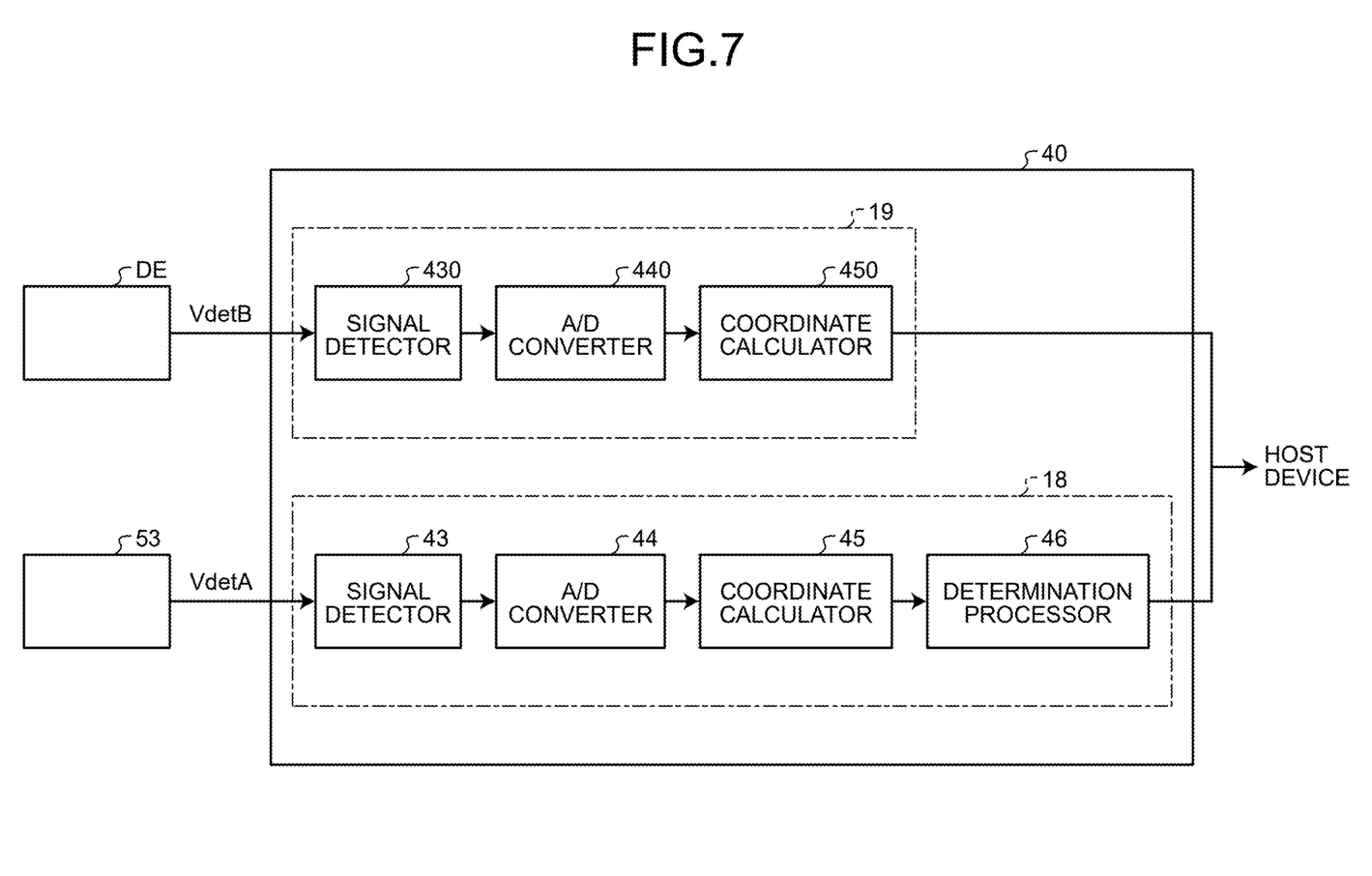
FIG. 7 is a block diagram illustrating an exemplary configuration of a detector.

FIG. 7 is a block diagram illustrating an exemplary configuration of the detector of a detection device according to the embodiment. As illustrated in FIG. 7, a detection signal VdetA is output to the detection IC 18 from the first electrodes 53. The detection signal VdetB is output to the detection IC 19 from the second electrodes DE. The detector 40 can detect existence of a detection target based on a detection signal VdetB of the second electrodes and can detect existence of a touch on the display panel 30 based on the detection signal VdetA.

As illustrated in FIG. 7, the detection IC 18 includes a signal detector 43, an analog-to-digital (A/D) converter 44, a coordinate calculator 45, and a determination processor 46. The detection IC 19 includes a signal detector 430, an A/D converter 440, and a coordinate calculator 450.

The signal detector 43 generates an output value of each first electrode 53 based on the detection signal VdetA of each first electrode 53. The A/D converter 44 samples the output value of each first electrode 53 and converts the output value into a digital signal.

The coordinate calculator 45 calculates the spatial coordinate of a position where a detected detection target exists based on the output values of the first electrodes 53.

Based on detection values of the first electrodes 53, the determination processor 46 determines a detection target moving from the left side to the right side to be the left-side user approaching from the left side, and determines a detection target moving from the right side to the left side to be the right-side user approaching from the right side.

The signal detector 430 generates an output value of each second electrode DE based on the detection signal VdetB of the second electrode DE. The A/D converter 440 samples the output value of each second electrode DE and converts the output value into a digital signal.

The coordinate calculator 450 calculates the spatial coordinate of a position where a detected detection target exists based on the output values of the second electrodes DE.

The detection IC 18 transmits, to an externally disposed host device, a command indicating the processing result of the determination processor 46, in other words, determination of the left-side user or the right-side user in a space above the first electrodes 53.

The detection IC 19 transmits, to the externally disposed host device, the spatial coordinate calculated by the coordinate calculator 450 and indicating the position of a detection target in a space above the display region Ad.

Figure 8:
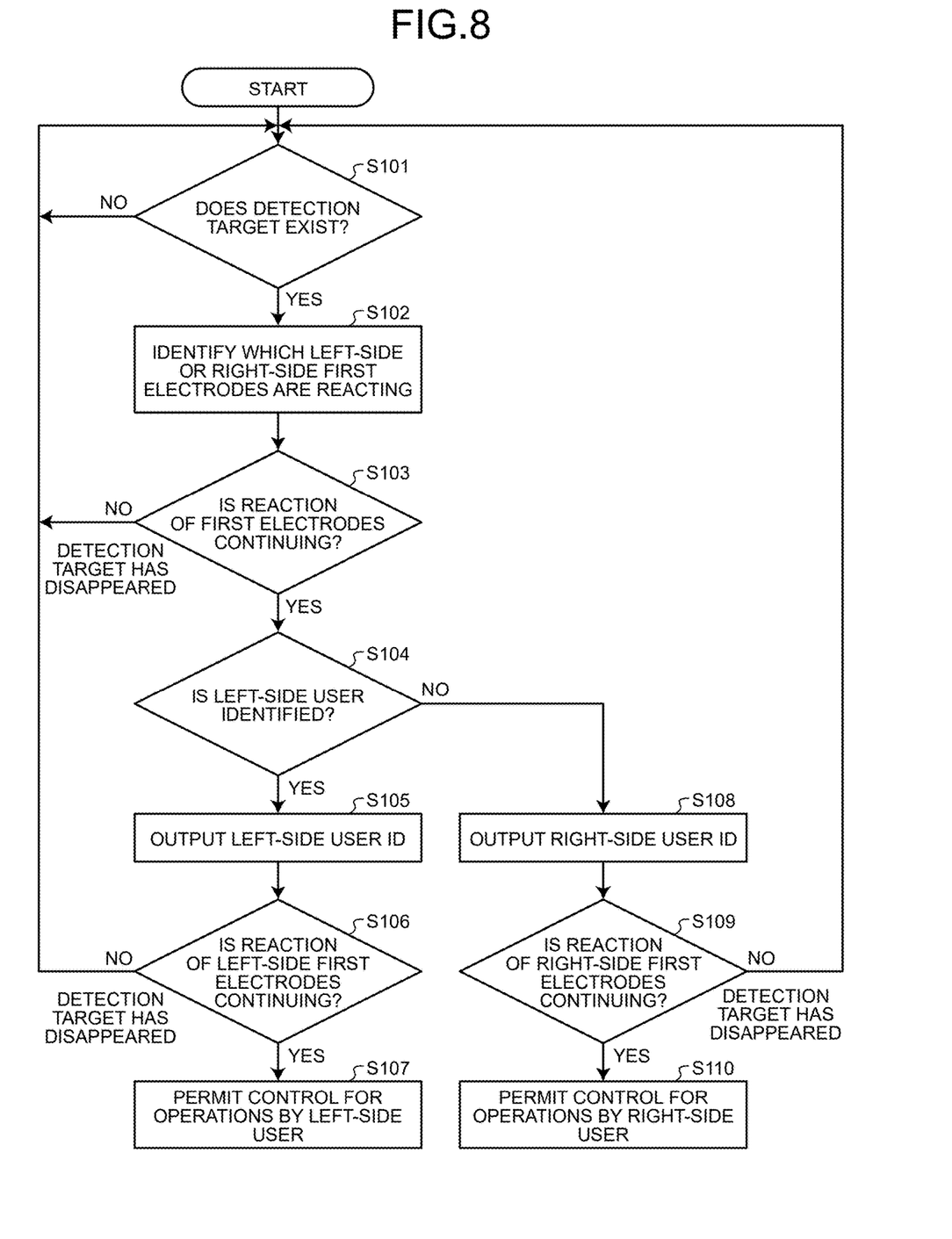
FIG. 8 is a flowchart illustrating an example of determination processing in the display device according to the first embodiment.

The following describes processing of determining whether a detection target is approaching from the left side or the right side with reference to FIG. 8. FIG. 8 is a flowchart illustrating an example of the determination processing in the display device according to the first embodiment.

First, the determination processor 46 determines whether a detection target exists in the space above the first electrodes 53 (step S101). If having determined that a detection target exists in the space above the first electrodes 53 (Yes at step S101), the determination processor 46 identifies which first electrodes 53, the left-side first electrodes 530 or the right-side first electrodes 531, are reacting (step S102). If the first electrodes 53 are reacting at step S102, the detector 40 performs hover detection of the detection target having approached the first electrodes 53.

If having not determined that a detection target exists in the space above the first electrodes 53 (No at step S101), the determination processor 46 returns to the processing at step S101.

Subsequently, the determination processor 46 determines whether the reaction of the first electrodes 53 is continuing (step S103).

If having determined that the reaction of the first electrodes 53 is continuing (Yes at step S103), the determination processor 46 identifies whether the detection target having approached the first electrodes 53 is the left-side user based on the result of step S102 (step S104). If having not determined that the reaction of the first electrodes 53 is continuing (No at step S103), the determination processor 46 repeats the processing at steps S101 to S103 since the detection target in the space above the first electrodes 53 is in a state of having disappeared.

If the determination processor 46 has identified that the detection target having approached the first electrodes 53 is the left-side user (Yes at step S104), the detector 40 outputs the ID of the left-side user (step S105).

Subsequently, the determination processor 46 determines whether the reaction of the left-side first electrodes 530 is continuing (step S106).

If the determination processor 46 has determined that the reaction of the left-side first electrodes 530 is continuing (Yes at step S106), the host device permits control for operations by the left-side user (step S107). If having not determined that the reaction of the left-side first electrodes 530 is continuing (No at step S106), the determination processor 46 repeats the processing at steps S101 to S106 since the detection target above the left-side first electrodes 530 is in a state of having disappeared.

If having not identified that the detection target having approached the first electrodes 53 is the left-side user (No at step S104), the determination processor 46 identifies that the detection target having approached the first electrodes 53 is the right-side user. The detector 40 outputs the ID of the right-side user (step S108).

At step S108, the determination processor 46 determines whether the reaction of the right-side first electrodes 531 is continuing (step S109).

If the determination processor 46 has determined that the reaction of the right-side first electrodes 531 is continuing (Yes at step S109), the host device permits control for operations by the right-side user (step S110). If having not determined that the reaction of the right-side first electrodes 531 is continuing (No at step S109), the determination processor 46 repeats the processing at steps S101 to S109 since the detection target in the space above the right-side first electrodes 531 is in a state of having disappeared.

Thus, the determination processor 46 can disable touch operations by the left-side user at the position of the button r1, which cannot be visually recognized by the user, in the first image 1, and can enable touch operations by the right-side user on the button r1 displayed in the second image r. Specifically, when the left-side user performs operations, control allocated to the button r1, which cannot be visually recognized by the user, in the first image 1 is not executed, but when the right-side user performs operations, control allocated to the button r1 displayed in the second image r is executed.

The determination processor 46 can disable touch operations by the right-side user at the position of the button 11, which cannot be visually recognized by the user, in the second image r, and can enable touch operations by the left-side user on the button 11 displayed in the first image 1. Specifically, when the right-side user performs touch operations, control allocated to the button 11, which cannot be visually recognized by the user, in the second image r is not executed, but when the left-side user performs touch operations, control allocated to the button 11 displayed in the first image 1 is executed.

Accordingly, as illustrated in FIG. 1, the user UL as the left-side user who can visually recognize the first image 1 can perform a touch operation on the button 11 displayed in the first image 1, and the user UR as the right-side user who can visually recognize the second image r can perform a touch operation on the button r1 displayed in the second image r. In this case, the user UL cannot perform a touch operation on the button r1 displayed in the second image r, and the user UR cannot perform a touch operation on the button 11 displayed in the first image 1.

Second Embodiment

Figure 9:
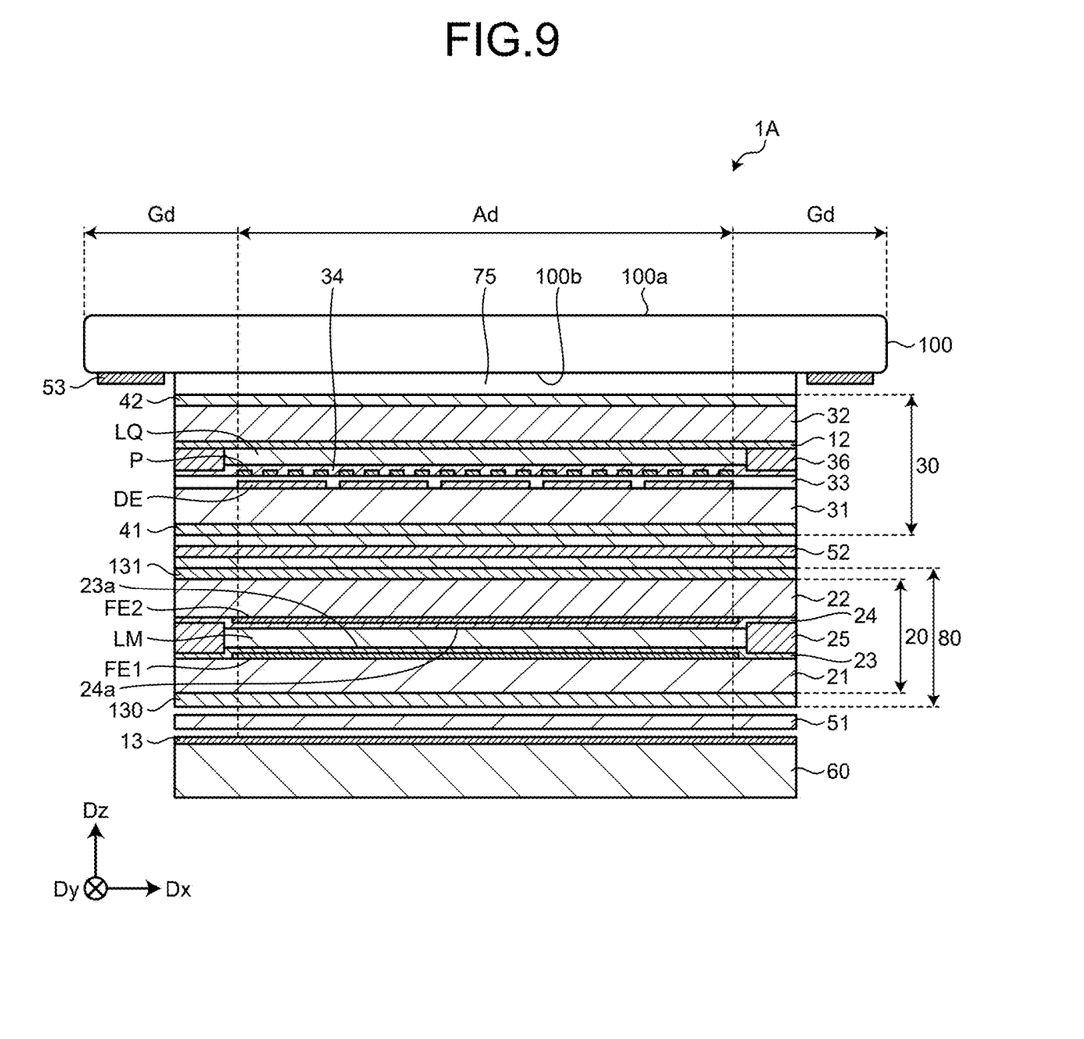
FIG. 9 is a sectional view illustrating a schematic sectional structure of a display device according to a second embodiment.

FIG. 9 is a sectional view illustrating a schematic sectional structure of a display device according to a second embodiment. In the following description, any constituent component same as that described above in the above-described embodiment is denoted by the same reference sign, and duplicate description thereof is omitted. The plan view of a display device 1A according to the second embodiment is the same as FIG. 5 and thus is omitted.

As illustrated in FIG. 9, the display device 1A according to the second embodiment includes a light adjuster 80, the display panel 30, the light source 60, a phase difference generation layer 51, a phase difference generation layer 52, and the cover member 100. In the display device 1A, the light source 60, the phase difference generation layer 51, the light adjuster 80, the phase difference generation layer 52, the display panel 30, and the cover member 100 are stacked in the stated order from one side in the third direction Dz toward the other side.

The light adjuster 80 has a configuration in which a third polarization layer 130, a liquid crystal panel 20, and a fourth polarization layer 131 overlap one another from one side in the third direction Dz toward the other side. The third polarization layer 130 and the fourth polarization layer 131 are optical members provided to allow most transmission of polarized light in a specific direction. The specific direction is referred to as a transmission axis direction. The transmission axis direction extends along a polarization plate. The transmission axis direction is orthogonal to the third direction Dz. A direction orthogonal to the transmission axis direction and the third direction Dz is referred to as an absorption axis direction. The absorption axis direction is a polarization direction in which light is most unlikely to transmit through the polarization plate.

In the liquid crystal panel 20, a third substrate 21 is provided on one side of a liquid crystal layer LM and a fourth substrate 22 is provided on the other side. The third substrate 21 and the fourth substrate 22 are light-transmitting substrates such as glass substrates. The third substrate 21 and the fourth substrate 22 are not limited thereto but may be any other light-transmitting substrates. Hereinafter, the phrase "one surface" means a surface of a plate-shaped component on the one side in the third direction Dz. The phrase "the other surface" means a surface of the plate-shaped component on the other side in the third direction Dz.

A third electrode FE1 is formed on the other surface of the third substrate 21. A fourth electrode FE2 is formed on the one surface of the fourth substrate 22. The third electrode FE1 and the fourth electrode FE2 are electrodes provided to cover the display region Ad. The other surface of the third electrode FE1 and the other surface of the third substrate 21 in an area in which the third electrode FE1 is not formed are covered by an insulating layer 23. The one surface of the fourth electrode FE2 and the one surface of the fourth substrate 22 in an area in which the fourth electrode FE2 is not formed are covered by an insulating layer 24.

At least one of the third electrode FE1 and the fourth electrode FE2 is provided so that its potential can be changed in accordance with ON/OFF of operation of the liquid crystal panel 20. In other words, voltage generated between the third electrode FE1 and the fourth electrode FE2 is different between a case where the liquid crystal panel 20 is in operation (ON) and a case where the liquid crystal panel 20 is not in operation (OFF).

The liquid crystal layer LM is interposed at least in a display region AA between the insulating layer 23 and the insulating layer 24. A seal 25 is interposed between the insulating layer 23 and the insulating layer 24 outside the display region AA. The seal 25 is a frame-shaped member enclosing the liquid crystal layer LQ at a viewpoint of squarely viewing a plane (Dx-Dy plane) orthogonal to the third direction Dz. The liquid crystal layer LM is surrounded by the seal 25 between the insulating layer 23 and the insulating layer 24, and accordingly, enclosed in the liquid crystal panel 20.

An alignment film 23a is provided on the other surface of the insulating layer 23 at least in an area where the display region Ad is covered. An alignment film 24a is provided on the one surface of the insulating layer 24 at least in an area where the display region Ad is covered. The alignment films 23a and 24a align the orientation of each liquid crystal molecule contained in the liquid crystal layer LM with a particular direction. The orientation of each liquid crystal molecule changes as the potential difference between the third electrode FE1 and the fourth electrode FE2 changes.

The phase difference generation layers 51 and 52 are optical members that change the phase of light entering from the one side in the third direction Dz and transmit the light to the other side in the third direction Dz. The phase difference generation layers 51 and 52 are what is called ½ wave plates.

A polarization generation layer 13 is an optical member that converts light emitted from the other surface of the light source 60 into polarized light at a specific angle. The polarization generation layer 13 is, for example, a dual brightness enhancement film (DBEF) but not limited thereto and only needs to a component that can convert light emitted from the other surface of the light source 60 into polarized light at a specific angle. Light generated by the light source 60 is emitted to the other surface side of the display device 1A through the polarization generation layer 13, the light adjuster 80, and the display panel 30.

Figure 10:
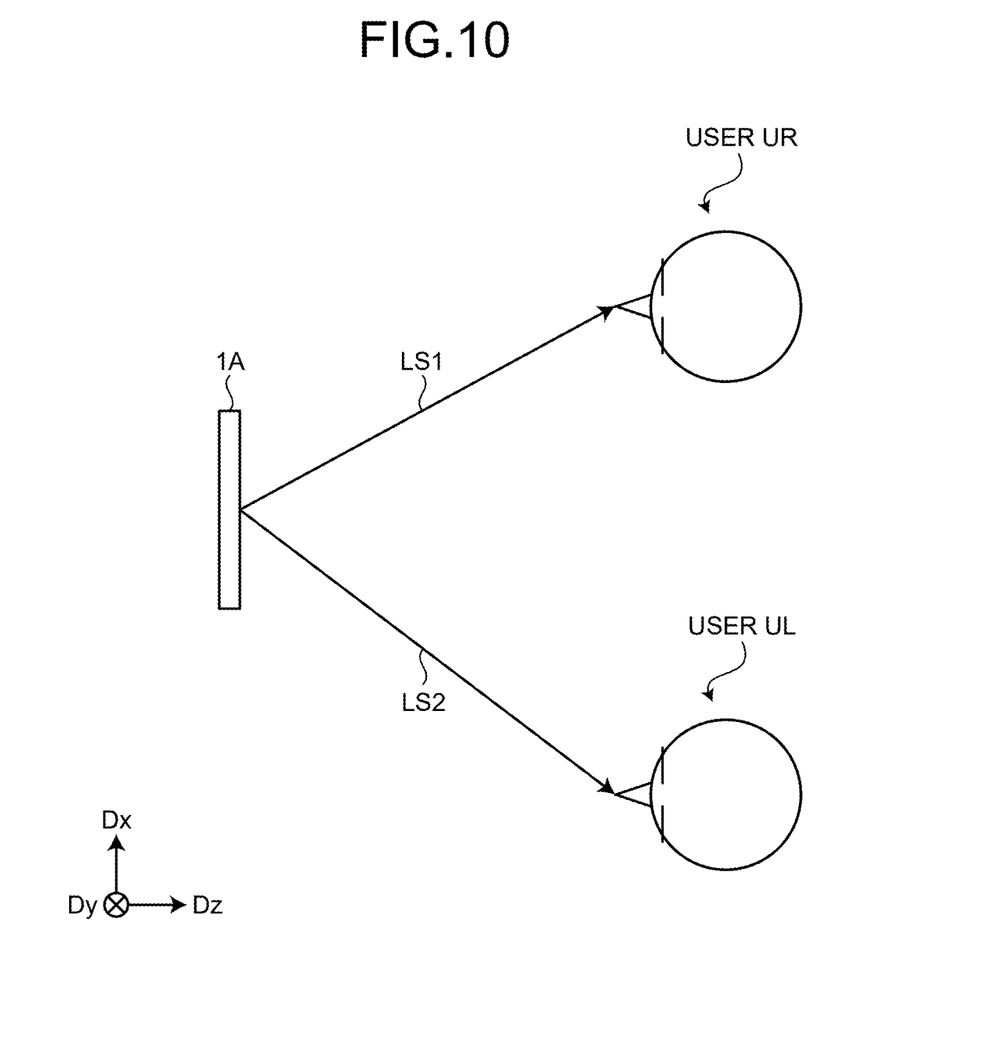
FIG. 10 is a schematic view illustrating an example of the relation among the display device, a user who can view an image regardless of whether a liquid crystal panel is in operation or not in operation (ON or OFF), and a user who cannot view the image when the liquid crystal panel is in operation (ON) in the second embodiment.

FIG. 10 is a schematic view illustrating an example of the relation among the display device, a user who can view an image regardless of whether the liquid crystal panel is in operation or not in operation (ON or OFF), and a user who cannot view the image when the liquid crystal panel is in operation (ON). In the present embodiment, a case where the display device 1A is provided in a four-wheel automobile will be described below.

As illustrated in FIG. 10, the users UR and UL are located at positions of obliquely viewing the other surface side of the display device 1A, in other words, the second polarization layer 42 side in a direction tilted toward the other side of the first direction Dx relative to the third direction Dz. Light LS1 of the image toward the user UR in display output by the display device 1A is tilted toward the one side in the first direction Dx. Light LS2 of the image toward the user UL in display output by the display device 1A is tilted toward the other side in the first direction Dx. In such a positional relation among the display device 1A and the users UR and UL, the users UR and UL are located at viewpoints of obliquely viewing the display device 1A.

The present embodiment assumes, for example, a case where the user UL is seated on the driver seat and the user UR is seated on the front passenger seat as illustrated in FIG. 10. Disposition of the driver seat and the front passenger seat is not limited thereto but may be opposite. For example, the user UL may be seated on the front passenger seat, and the user UR may be seated on the driver seat.

Figure 11:
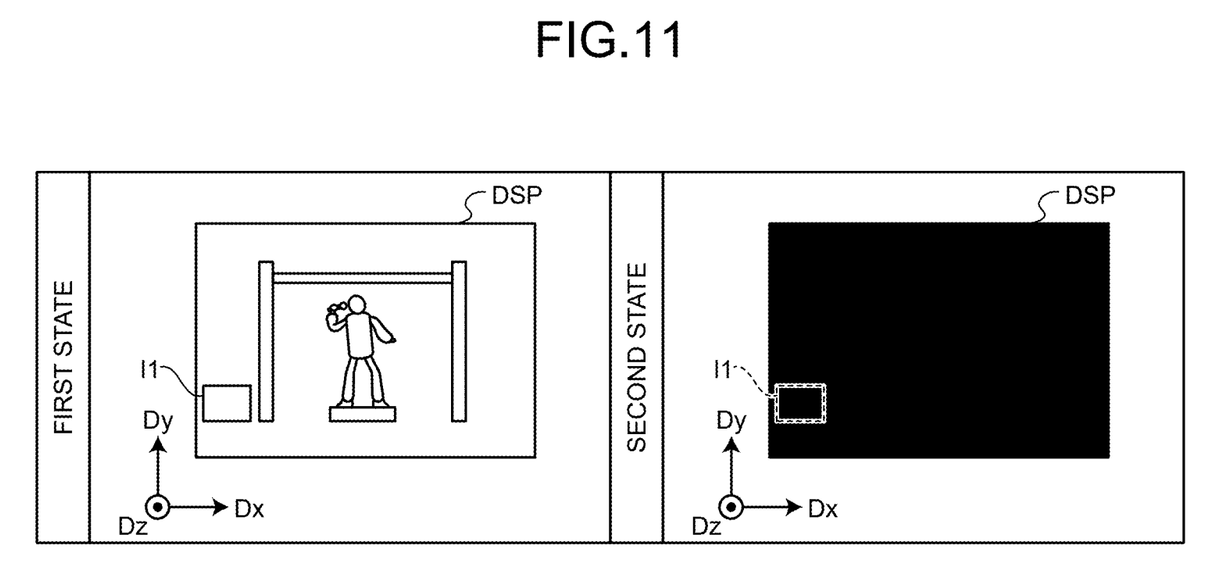
FIG. 11 is a schematic view illustrating a difference in images viewed by a user obliquely viewing the display device according to the second embodiment.

FIG. 11 is a schematic view illustrating a difference in images viewed by a user obliquely viewing the display device. As illustrated in FIG. 11, a state of the display device 1A in which the display panel 30 performs image display and the liquid crystal panel 20 is not in operation (OFF) is referred to as a first state. A state of the display device 1A in which the display panel 30 performs image display and the liquid crystal panel 20 is in operation (ON) is referred to as a second state.

As described above, a degree that light aligned with the third direction Dz transmits through the liquid crystal panel 20 when the liquid crystal panel 20 is not in operation (OFF) is equal to or larger than a degree that light intersecting the third direction Dz transmits through the liquid crystal panel 20. When a user is seated on the front passenger seat side, relatively high transmittance of light is obtained even when the liquid crystal panel 20 is in operation (ON). Thus, the user UR obliquely viewing the display device 1A can view an image DSP irrespective of whether the operation state of the display device 1A is the first state or the second state.

The aspect of the image DSP illustrated in FIG. 10 is merely exemplary and the present invention is not limited thereto. The display panel 30 may display and output an desired image.

On the other hand, when the liquid crystal panel 20 is in operation (ON), light transmittance significantly decreases as compared to the one side. Thus, a user obliquely viewing the display device 1A from the other side in the first direction Dx, in other words, a user seated on the driver seat side substantially cannot view the image DSP when the operation state of the display device 1A is the second state. Accordingly, when the operation state of the display device 1A is the first state, the user obliquely viewing the display device 1A from the other side in the first direction Dx, in other words, the user seated on the driver seat side can also view the image DSP.

As illustrated in FIG. 11, the image DSP is viewed as a rectangular image. Accordingly, the display region Ad has a rectangular shape corresponding to the image DSP illustrated in FIG. 11 when a user is seated on the front passenger seat side. Two sides among the four sides of the rectangle are aligned with the first direction Dx, and the other two sides are aligned with the second direction Dy. The light adjuster 80 differentiates, with respect to the third direction Dz, the transmission degree of light along a line tilted toward one side in the longitudinal direction (the first direction Dx) of the rectangle and the transmission degree of light along a line tilted toward the other side in the longitudinal direction. Accordingly, the light adjuster 80 generates the difference in viewing between the first and second states illustrated in FIG. 11.

Figure 12:
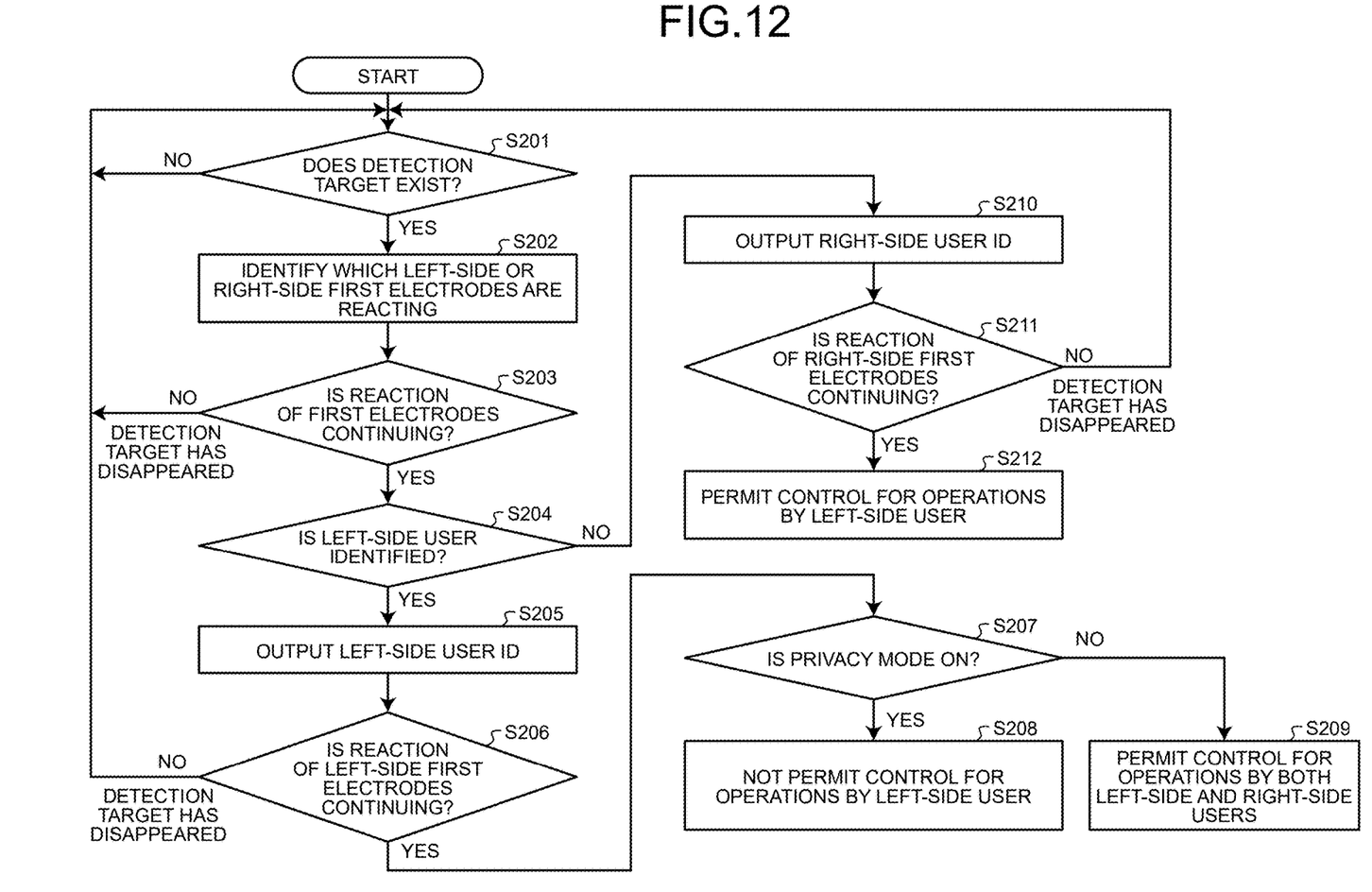
FIG. 12 is a flowchart illustrating an example of determination processing in the display device according to the second embodiment.

The following describes processing of determining whether a detection target is approaching from the left side or the right side with reference to FIG. 12. FIG. 12 is a flowchart illustrating an example of the determination processing in the display device according to the second embodiment.

First, the determination processor 46 determines whether a detection target exists in the space above the first electrodes 53 (step S201). If having determined that a detection target exists in the space above the first electrodes 53 (Yes at step S201), the determination processor 46 identifies which first electrodes 53, the left-side first electrodes 530 or the right-side first electrodes 531, are reacting (step S202). If the first electrodes 53 are reacting at step S202, the detector 40 performs hover detection of the detection target having approached the first electrodes 53.

If having not determined that a detection target exists in the space above the first electrodes 53 (No at step S201), the determination processor 46 returns to the processing at step S201.

Subsequently, the determination processor 46 determines whether the reaction of the first electrodes 53 is continuing (step S203).

If having determined that the reaction of the first electrodes 53 is continuing (Yes at step S203), the determination processor 46 identifies whether the detection target having approached the first electrodes 53 is the left-side user based on the result of step S202 (step S204). If having not determined that the reaction of the first electrodes 53 is continuing (No at step S203), the determination processor 46 repeats the processing at steps S201 to S203 since the detection target in the space above the first electrodes 53 is in a state of having disappeared.

If the determination processor 46 has identified that the detection target having approached the first electrodes 53 is the left-side user (Yes at step S204), the detector 40 outputs the ID of the left-side user (step S205).

Subsequently, the determination processor 46 determines whether the reaction of the left-side first electrodes 530 is continuing (step S206).

If having not determined that the reaction of the left-side first electrodes 530 is continuing (No at step S206), the determination processor 46 repeats the processing at steps S201 to S206 since the detection target in the space above the first electrodes 53 is in a state of having disappeared.

If having determined that the reaction of the left-side first electrodes 530 is continuing (Yes at step S206), the determination processor 46 determines whether a privacy mode is on (step S207). If the privacy mode is on (Yes at step S207), the host device does not permit control for operations on the display panel 30 (step S208). In this case, the host device permits control for operations only by a user who can visually recognize the display panel 30.

Thus, the determination processor 46 can disable operations by the left-side user and enable operations by the right-side user. Specifically, control allocated to the button on the display panel is not executed when the left-side user performs operations, but control allocated to the button on the display panel is executed when the right-side user performs operations.

Accordingly, to a user seated on the driver seat side, the operation state of the display device 1A is in the second state illustrated in FIG. 11 and the image DSP substantially cannot be visually recognized.

As illustrated in FIG. 11, the user on the front passenger seat side can visually recognize a button 12 displayed in the image DSP and can perform a touch operation on the button 12. However, the user on the driver seat side cannot visually recognize the button 12 displayed in the image DSP and cannot perform a touch operation on the button 12.

If the privacy mode is not on (No at step S207), the host device permits control for operations by both the left-side and right-side users (step S209).

Accordingly, the determination processor 46 can enable operations by both the user seated on the driver seat side and the user seated on the front passenger seat side. In other words, control allocated to the button on the display panel is executed for touch operations by any of the left-side and right-side users. Examples of cases where the privacy mode is not on include cases where the four-wheel automobile is stopping or parked.

If having not identified that the detection target having approached the first electrodes 53 is the left-side user (No at step S204), the determination processor 46 identifies that the detection target having approached the first electrodes 53 is the right-side user. The detector 40 outputs the ID of the right-side user (step S210).

After step S110, the determination processor 46 determines whether the reaction of the right-side first electrodes 531 is continuing (step S211).

If the determination processor 46 has determined that the reaction of the right-side first electrodes 531 is continuing (Yes at step S211), the host device permits control for operations by the right-side user (step S212). If having not determined that the reaction of the right-side first electrodes 531 is continuing (No at step S211), the determination processor 46 repeats the processing at steps S201 to S208 since the detection target in the space above the first electrodes 53 is in a state of having disappeared.

Accordingly, only the right-side user can perform a touch operation on the button displayed in the image on the display panel 30, and the left-side user cannot perform a touch operation on the button displayed in the image on the display panel 30.

Preferable embodiments of the present invention are described above, but the present invention is not limited to such embodiments. Contents disclosed in the embodiments are merely exemplary, and various kinds of modifications are possible without departing from the scope of the present invention. Any modification performed as appropriate without departing from the scope of the present invention belongs to the technical scope of the present invention. At least one of various kinds of omission, replacement, and modification of any constituent component may be performed without departing from the scope of the above-described embodiments and modifications.

What is claimed is:

1. A display device comprising:
a display panel including a display region configured to display an image;
a plurality of first electrodes provided in a frame region outside the display region;
a plurality of second electrodes provided in the display region; and
a detector configured to detect a detection target based on detection signals of the first electrodes, wherein
the first electrodes include a left-side first electrode disposed on a left side of a virtual line bisecting the display region and passing through a geometric center of the display region, and a right-side first electrode disposed on a right side of the virtual line, and
the detector includes a determination processor configured to
determine the detection target moving from the left side to the right side to be a left-side user approaching from the left side based on a detection value of the left-side first electrode, and
determine the detection target moving from the right side to the left side of the display region to be a right-side user approaching from the right side based on a detection value of the right-side first electrode.

2. The display device according to claim 1, further comprising a parallax barrier at a position overlapping the display panel, the parallax barrier being configured to distribute light having transmitted through the display panel to either one user or the other user, wherein the display panel allows a first image to be visually recognized by one user and a second image to be visually recognized by the other user.

3. The display device according to claim 1, wherein the determination processor disables operations by a left-side user approaching from the left side and enables operations by a right-side user approaching from the right side.

4. The display device according to claim 1, wherein the determination processor disables operations by a right-side user approaching from the right side and enables operations by a left-side user approaching from the left side.

5. The display device according to claim 3, wherein the determination processor enables operations by both a left-side user approaching from the left side and a right-side user approaching from the right side.

6. The display device according to claim 4, wherein the determination processor enables operations by both a left-side user approaching from the left side and a right-side user approaching from the right side.

* * * * *